I. R. POTTER.
Thill Coupling.
No. 80,214.
Patented July 21, 1868.
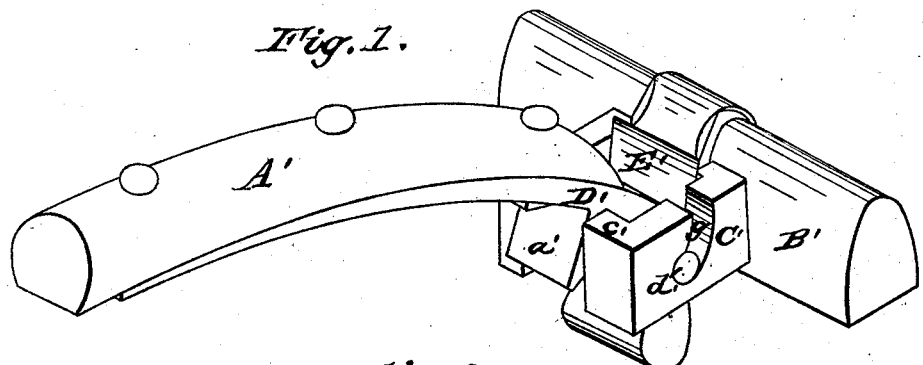
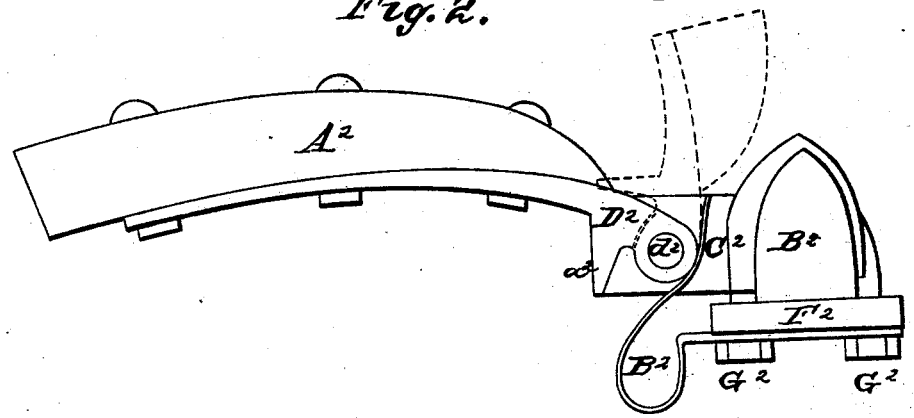
Witnesses:
Jno. Davy
Th. E. W. White
Inventor:
Isaac R. Potter

United States Patent Office.

ISAAC R. POTTER, OF DARTMOUTH, MASSACHUSETTS.

Letters Patent No. 80,214, dated July 21, 1868.

IMPROVEMENT IN THILL-COUPLING.

The Schedule referred to in these Letters Patent and making part of the same.

TO ALL WHOM IT MAY CONCERN:

Be it known that I, ISAAC R. POTTER, of Dartmouth, in the county of Bristol, in the State of Massachusetts, have invented a new and improved "Thill-Coupling," by which thills of carriages may be easily and quickly attached and detached; and I do hereby declare that the following is a full and exact description thereof, reference being had to the accompanying drawings, and to the letters of reference marked thereon.

My invention consists in forming one jaw of the clip with a slot, and with a projection on the end, and the thill-iron with a projection on the under side, and with an arbor screwed or otherwise secured in the end, the ends of which arbor project on either side, and fit into corresponding holes in each jaw of the clip, and a spring to hold the coupling more firmly in connection.

Figure 1 is a perspective view of my invention, connected.

Figure 2 is a longitudinal section, showing the form of thill-iron and spring.

Fig. 1. $A^1$ is the thill; $B^1$, axle-tree; $C^1$, clip; $D^1$, thill-iron; $E^1$, spring; $a^1$, projection on under side of thill-iron; $c^1$, projection on jaw of clip; $d^1$, one end of arbor; $g^1$, slot.

Fig. 2. $A^2$, thill; $B^2$, axle-tree; $C^2$, clip; $D^2$, thill-iron; $E^2$, spring; $F^2$, bar forming under side of clip; $G^2 G^2$, nuts; $a^2$, projection on thill-iron; $d^2$, arbor.

The end of arbor, not shown, is as long as the thickness of projection $c^1$. The end shown is double the length of the other.

Operation.

The clip, thill-iron, and spring being made and applied, as shown and described, the application and operation may be noted. When it is desired to attach the thills, they are raised till the inner side of projection $a^1$ is parallel to the top of the clip, the thills being pressed against the jaw of the clip, in and to which are the slot and projection, are forced down, then laterally towards the other jaw of the clip, forcing the other end of the arbor into its bearing, till it brings up, when the thills can be dropped, and will be firmly held from lateral motion by projection $a^1$.

By reversing this operation the thills may be detached.

In this invention I do not claim any device previously invented or patented for attaching thills to carriages, but,

What I claim as my invention, and desire to secure by Letters Patent, is—

Making the clip $C^1$ with projection $c^1$, and slot $g^1$ on and in one jaw of same, and the thill-iron $D^2$ with projection $a^2$ and arbor $d^2$, made and operating substantially as and for the purpose specified.

ISAAC R. POTTER.

Witnesses:
TH. E. M. WHITE,
JNO. DAVIS.